US011212726B2

(12) United States Patent
Zhou et al.

(10) Patent No.: US 11,212,726 B2
(45) Date of Patent: Dec. 28, 2021

(54) EMPLOYING SIGNAL TO INTERFERENCE-NOISE RATIO IN DETERMINING INITIATION OF A USER EQUIPMENT HANDOVER EVENT IN A 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Jianchun Zhou, Bellevue, WA (US); Sameer Sangal, Redmond, WA (US)

(73) Assignees: AT&T Intellectual Property I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 40 days.

(21) Appl. No.: 16/520,055

(22) Filed: Jul. 23, 2019

(65) Prior Publication Data

US 2021/0029607 A1 Jan. 28, 2021

(51) Int. Cl.
*H04W 36/20* (2009.01)
*H04B 17/336* (2015.01)
(Continued)

(52) U.S. Cl.
CPC .......... *H04W 36/20* (2013.01); *H04B 17/336* (2015.01); *H04W 36/08* (2013.01); *H04W 36/245* (2013.01)

(58) Field of Classification Search
CPC ... H04W 36/20; H04W 36/08; H04W 36/245; H04W 36/30; H04W 36/24; H04W 36/16;
(Continued)

(56) References Cited

U.S. PATENT DOCUMENTS

| 2009/0028112 A1* | 1/2009 | Attar | H04W 36/30 370/332 |
| 2009/0046573 A1* | 2/2009 | Damnjanovic | H04W 36/30 370/216 |

(Continued)

OTHER PUBLICATIONS

Enrique R. Bastidas-Puga; Ángel G. Andrade Guillermo Galaviz; David H. Covarrubias; "Handover based on a predictive approach of signal-to-interference-plus-noise ratio for heterogeneous cellular networks," Apr. 2019, IET Communications vol. 13 Issue 6, p. 672-678 (Year: 2019).*

*Primary Examiner* — Maharishi V Khirodhar
*Assistant Examiner* — Kenneth P Hunt
(74) *Attorney, Agent, or Firm* — Amin, Turocy & Watson, LLP

(57) ABSTRACT

Determining to initiate a user equipment handover event based on a signal-to-interference-plus-noise ratio value is disclosed. The disclosed subject matter can employ the signal-to-interference-plus-noise ratio value in lieu of a reference signal receive power value. In an aspect, a handover based on the signal-to-interference-plus-noise ratio value can generally be determined faster and with greater reliability than basing the handover on the reference signal receive power value. In an aspect, some embodiments can substitute a determined uplink signal-to-interference-plus-noise ratio value for a downlink signal-to-interference-plus-noise ratio value. In some embodiments, a predicted signal-to-interference-plus-noise ratio value can be determined based on historical channel characteristics, hysterical wireless network environment features, or other historical data. A predicted signal-to-interference-plus-noise ratio value can be validated to a determined current signal-to-interference-plus-noise ratio value, permitting a validated predicted value to be employed until a next validation event.

20 Claims, 10 Drawing Sheets

(51) Int. Cl.
*H04W 36/08* (2009.01)
*H04W 36/24* (2009.01)

(58) Field of Classification Search
CPC . H04W 36/165; H04W 36/246; H04W 36/26; H04W 36/00837; H04B 17/336
See application file for complete search history.

(56) References Cited

U.S. PATENT DOCUMENTS

| | | | |
|---|---|---|---|
| 2013/0343346 A1* | 12/2013 | Chen | H04L 1/0026 |
| | | | 370/332 |
| 2018/0220340 A1* | 8/2018 | Ramachandra | H04W 36/30 |
| 2019/0020431 A1* | 1/2019 | Chae | H04W 76/14 |
| 2020/0015136 A1* | 1/2020 | Damnjanovic | H04W 36/0085 |
| 2020/0344682 A1* | 10/2020 | Kvernvik | G06N 3/006 |

* cited by examiner

EMPLOYING SIGNAL TO INTERFERENCE-NOISE RATIO IN DETERMINING INITIATION OF A USER EQUIPMENT HANDOVER EVENT IN A 5G OR OTHER NEXT GENERATION NETWORK

TECHNICAL FIELD

The disclosed subject matter relates to determining to initiate a handover event for a user equipment (UE) in a wireless network, more specifically employing a signal to interference-noise ratio (SINR) value in determining to initiate a handover event for a UE in a wireless network, for example, a 5G (5th Generation) wireless network or other next generation network.

BACKGROUND

Conventional wireless networks, for example 3G, 4G, etc., wireless networks, can employ downlink (DL) reference signal receive power (RSRP) reports provided by a UE to facilitate determining initiation of a handover event for a UE in the conventional wireless network. Generally, the use of DL RSRP reports relies on transmission of a reference signal to a UE, the UE determining the received power of the reference signal and then communicating this information back to a base station so that the base station can then determine if a handover event should be initiated. Many aspects of this process can consume time, resulting in the use of DL RSRP reports for UE handovers being considered a slow process. In an aspect, the reference signal can be sent in a periodic manner, such that the UE must wait for a reference signal to be transmitted before the reception strength of the reference signal can be even be measured. Moreover, the measurement, once the reference signal has been received, can be determined and the measurement data can then be bundled into an uplink (UL) communication for transmission back to a base station, consuming further time. Additionally, where the DL reference signal is typically transmitted from a base station, and where base stations typically have greater transmission power than a UE, e.g., the UL transmission from the UE to the base station will generally be at a lower power than the DL transmission from the based station to the UE, the UL transmission from the UE to the base station with the RSRP report can actually fail even where the UE can have received the DL reference signal, e.g., the DL can reach the UE, but the UL may not be able to reach the base station because it can have insufficient transmission power. Accordingly, in addition to typically be considered a slow process, the RSRP report can also be plagued by reporting failures. Further, the RSRP can be inaccurate across frequencies, for example, in an orthogonal frequency division multiplexed (OFDM) wireless network environment, the RSRP report may be inaccurate for many of the OFDM frequencies in use by UEs in the OFDM network. These deficiencies can make use of RSRP undesirable. However, RSRP is still typically employed because it is relatively simple to implement, has been included in wireless standards, and can be performed on relatively low levels of computing resources, e.g., can be performed on a cell phone level computing device. It is desirable to use other metrics to inform handover events, more especially where wireless networks are becoming less tolerant of slow or inaccurate measurements that can lead to radio link failure (RLF).

DETAILED DESCRIPTION

Figure 1:
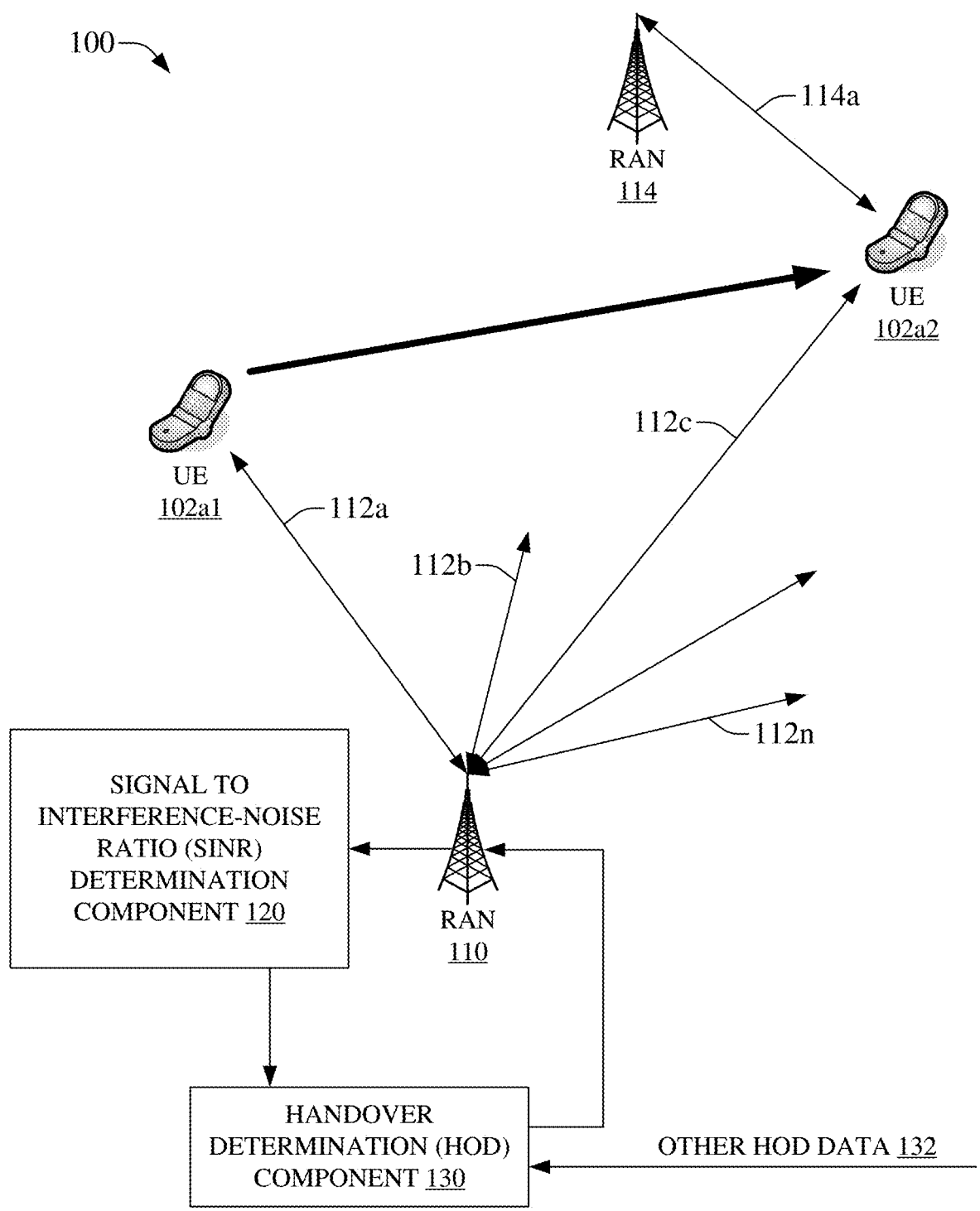
FIG. 1 is an illustration of an example system that can facilitate employing SINR values in determining initiation of UE handover events, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted elsewhere herein, conventional wireless networks can employ DL RSRP reports, provided by a UE, to facilitate determining initiation of a handover event for a UE. Generally, the use of DL RSRP reports relies on transmission of a reference signal to a UE, the UE determining the received power of the reference signal and then communicating this information back to a base station so that the base station can then determine if a handover event should be initiated. Many aspects of this process can be considered slow, resulting in the total time to receive a DL RSRP report from a UE being slow, e.g., on the order of 40+ milliseconds (msec). This can be further delayed because the reference signal that the RSRP report relies on may only be sent periodically, which can add even more delay, e.g., the UE must wait for a reference signal to be transmitted before the reception strength of the reference signal can be even be measured. Moreover, the measurement, once the reference signal has been received, must be computed/determined and the measurement data must then be transmitted via an UL communication back to a base station. This time consuming process can be circumvented by employing a value that can be determined at a base station.

Further, the conventional RSRP report is transmitted via UL channels that can be less robust than the DL channels that carry reference signals. As such, the typically greater transmission power of a DL channel, in comparison to an UL channel, can result in RSRP reports simply being lost in the air interface. As an example, where a UE can receive a reference signal via a strong DL transmission, the UE can compute the RSRP report and the UE can transmit the RSRP report on an UL channel. The UL channel can be insufficiently strong for the RSRP report to be received at a base station. This can result in a lost RSRP report, or delay due to resending the RSRP report, e.g., in response to a failed 'ack' signal, etc., which can result in a radio link failure (RLF). Again, use of a value that can be determined at the base station can avoid loss or delay of RSRP reports that can result in RLFs.

RSRP measurements are also known to be unstable/inaccurate across frequencies. In a frequency multiplexed wireless network environment, the RSRP report may be inaccurate for many of the frequencies in use by the network. This can cause inaccurate initiation of handover events that can affect the quality of a network. Use of a value that is not as variable across frequency is desirable in modern networks. The almost legacy use of DL RSRP reports from UEs is believed to be undesirable, e.g., RSRP reports were acceptable in older networks that lacked modern computing power, had wider beam coverage areas that were more tolerant of fading, underwent fewer handover events, etc. However, in modern wireless networks, e.g., 5G type networks, etc., there can be many more handovers due to beamforming, fast fading conditions, etc., such that predicating handovers on a value that is more suited to a modern network than RSRP reports is needed to have the modern network operated satisfactorily.

In an aspect, 5G wireless communication is expected to provide each UE with a beam of radio energy, in contrast to previous technologies that generally provided broader coverage of multiple UEs in a larger region, e.g., service provided to all devices in a 120-degree sector of a cell site. This maturation of wireless network technologies can result in many individual beams each serving a corresponding UE. This can lead to decreased beam footprints that can experience fading to a greater degree than older network technologies. Moreover, each beam can experience unique conditions that result in different handover event determinations. As an example, where a region of a wireless network covers 1000 UEs, the base stations can provide 1000 distinct beams of radio energy, which can require computing timing delay, phase shifting, amplitude adjustments, etc., to many radiative elements of an antenna to provide the 1000 beams, and can further require altering these computations to reduce inference associated with the 1000 beams. Additionally, in this example, there can be further computations related to multiplexing, in time, frequency, etc., related to effectively providing communication for the 1000 devices via the 1000 beams. When performed properly, the 5G-type wireless network technology can provide fast and reliable wireless service. However, the computations can be complex and result in unique beams that may each undergo different handover event environments. Accordingly, RSRP reporting can be insufficient to provide adequate handover reliability. The use of RSRP in a modern wireless network like 5G can experience performance that can be sub-optimal. The present disclosure incorporates the use of a SINR value that can be determined at a base station for each beam without the delay, variability, etc., of a UE generated RSRP report.

Additionally, beam parameters for various conditions can be determined, e.g., the way beams perform in a given environment can be 'learned,' allowing a 'library' of SINR values to be precomputed, allowing machine learning to predict a SINR value, etc., in a manner that is not attainable in current RSRP reporting type handover determining technology. The use of a library, machine learning, etc., can then enable determining to initiate a handover event at substantially greater speed that waiting for a reference signal to be sent, the RSRP to be computed, and hoping the RSRP report is successfully transmitted back to the base station before the RSRP report can even be used to determine if a handover should occur. Modern wireless network technology is distinct from earlier generations that typically served all devices in a region and, as such, it can be appreciated that use of a faster and more accurate value for handover events can be desired. Additionally, in some 5G wireless networks, for example, those that employ time division multiplexing, rather than frequency division multiplexing, the use of an UL SINR value can be applied to evaluating a DL channel, an UL channel, or both, in relation to causing a handover event to a different beam, different base station, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate employing SINR values in determining initiation of UE handover events, in accordance with aspects of the subject disclosure. System 100 can comprise radio access network (RAN) nodes 110 and 114. RAN 110 and 114 can enable connection to a wireless network, e.g., UEs can connect to a wireless network via RANs 110, 114, etc. In an aspect, RANs, e.g., 110, 114, etc., can link to UEs, e.g., UE 102, via electromagnetic energy, hereinafter beams, e.g., 112a, 112b, 112c, ..., 112n, etc. The beams can have differing characteristics, e.g., resulting from environmental aspects such as other beams/interferers, noise, attenuation, etc. As an example, a beam passing through a building can be more attenuated than a beam not passing through a building. As another example, a beam among many other beams can experience more interference than another beam without many other beams nearby. As a further example, a beam passing near a welding shop can experience more noise than a beam passing far from the welding shop. Numerous other examples will be readily appreciated by one of skill in the art and all such examples are to be considered within the scope of the instant disclosure even where note explicitly recited for the sake of clarity and brevity.

In an aspect, SINR determination component 120 can receive data relevant to determining a SINR value. As examples, SINR determination component 120 can receive reference signals from other RANs, signal reports from UEs, measured signal data from test fixtures, measurements related to other beams from the same or other RANs, etc. This data can be employed by SINR determination component 120 to determine a SINR value. In an embodiment, SINR can be equal to the power of measured usable signals, for example, reference signals, physical shared channel signals, etc., divided by the sum of interference power and background noise, wherein interference power can be the measured power of interfering channels from other nodes of a wireless system, etc., and wherein noise can be determined for measurement bandwidths and receiver noise coefficients. In an aspect, the signal, interference, and noise can be measured over the same bandwidth and can be normalized to a subcarrier bandwidth. In some embodiments, $$SINR = \frac{1}{\frac{1}{12 * RSRQ} - x},$$

where RSRQ=N*(RSRP/RSSI), x=RE/RB, RSRP is a measured reference signal receive power value, e.g., defined as the linear average over the power contributions (in [W]) of the resource elements that carry cell-specific reference signals within the considered measurement frequency bandwidth, RSSI is a received signal strength indicator and measures all power within the measurement bandwidth, RE is a resource element value, RB is resource block value, and where N varies with frequency.

Handover determination (HOD) component 130 can receive a SINR value from SINR determination component 120. In an aspect, HOD component 130 can determine if a handover event will be initiate based on the SINR value, e.g., if the SINR value is insufficient a handover can be initiated to cause the UE to be moved to a new beam with an adequate SINR value, a new RAN with a beam having an adequate SINR value, etc. In an aspect, HOD component 130 can receive other HOD data 132 that can be employed in determining to initiate a handover event. In an aspect, other HOD data 132 can comprise SINR value thresholds, models/formula for determining when a handover can be initiated, exceptions to handovers, heuristic conditions for handover, me periods/delays before initiating a handover, etc. In an example, if a SINR value, e.g., from SINR determination component 120, etc., is sufficient to cause a handover, other HOD data 132 can comprise an example condition for handover that can prevent the handover from being initiated while the condition is determined to be occurring, can prevent the handover from occurring at all, etc.

RAN 110 can receive HOD action data from HOD component 130. HOD action data can cause a handover event to be initiated at RAN 110. This can result in a handover of the UE from a first beam to a second beam, wherein the first and second beam can be from the same or different RAN devices. As an example, as UE 102 moves from position a1 to a2, indicated by UE 102a1 and UE 102a2 respectively, the SINR value of beam 112a can change and can cause a handover, e.g., via SINR determination component 120 and HOD component 130, from beam 112a to beam 112c or to beam 114a of RAN 114.

Figure 2:
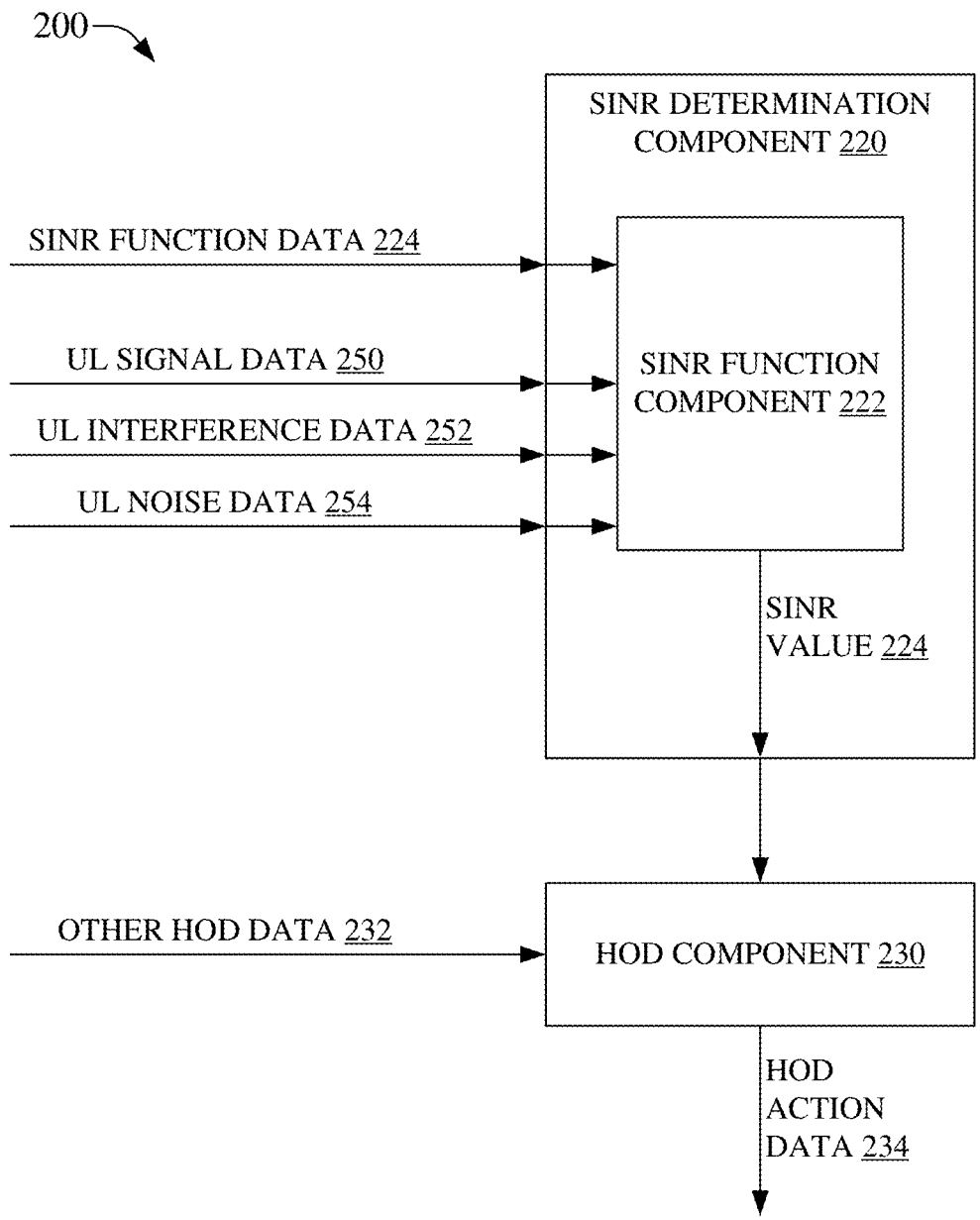
FIG. 2 is an illustration of an example system that can facilitate determining SINR values employed in determining if a UE handover should occur, in accordance with aspects of the subject disclosure.

FIG. 2 is an illustration of a system 200, which can enable determining SINR values employed in determining if a UE handover should occur, in accordance with aspects of the subject disclosure. System 200 can comprise SINR determination component 220 that can comprise SINR function component 222. SINR determination component can receive SINR function data 224 that can comprise information relating to a SINR function that can be employed to generate a SINR value based on beam/environment condition measurements. SINR function data 224 can be employed to designate, update, alter, etc., an applied SINR function at SINR function component 222. Beam/environment condition measurements can be received by SINR determination component 220 and passed to SINR function component 222 where they can be subjected to a SINR function to yield SINR value 224 that can be made available to HOD component 230. In an aspect, beam/environment condition measurements can comprise UL signal data 250 which can measure usable signal power, UL interference data 252 that can measure interference power, UL noise data 254 that can measure noise value, etc.

HOD component 230 can determine HOD action data 234 based on received SINR value 224, from SINR determination component 220, and, in some embodiments, further based on other HOD data 232, as disclosed elsewhere herein. HOD action data 234 can be communicated to a RAN device, e.g., RAN 110, 114, etc., wireless network node, e.g., gNB, eNB, etc., and can cause initiation of a handover event, e.g., trigger, cause, result in, etc., a handover event occurring.

In an aspect, system 200 illustrates use of uplink signal, interference, noise, etc., data and can correspondingly be understood to generate an uplink SINR value. It will be appreciated that wireless networks can use different technologies, e.g., time multiplexing, frequency multiplexing, etc. In some time multiplexed wireless networks, the uplink and downlink can be shared on the same channel but multiplexed in time rather than frequency, etc. As such, in time multiplexed wireless network, the DL SINR value can be understood to be the same as the UL SINR value because the up- and downlink occur on the same channel over very small time intervals. As such, this allows system 200 to receive UL channel characteristics, e.g., 250, 252, 254, etc., and to generate SINR value 224 that can be regarded as either an UL SINR value or a DL SINR value. For a time multiplexed network, the SINR value can therefore be measured directly by a base station, RAN device, gNB, eNB, etc., based on incoming UL channel characteristics. It will be appreciated that this removes the restriction of signaling to a UE and waiting for a report to be returned from the UE to the base station as can occur in RSRP report handover control techniques.

Figure 3:
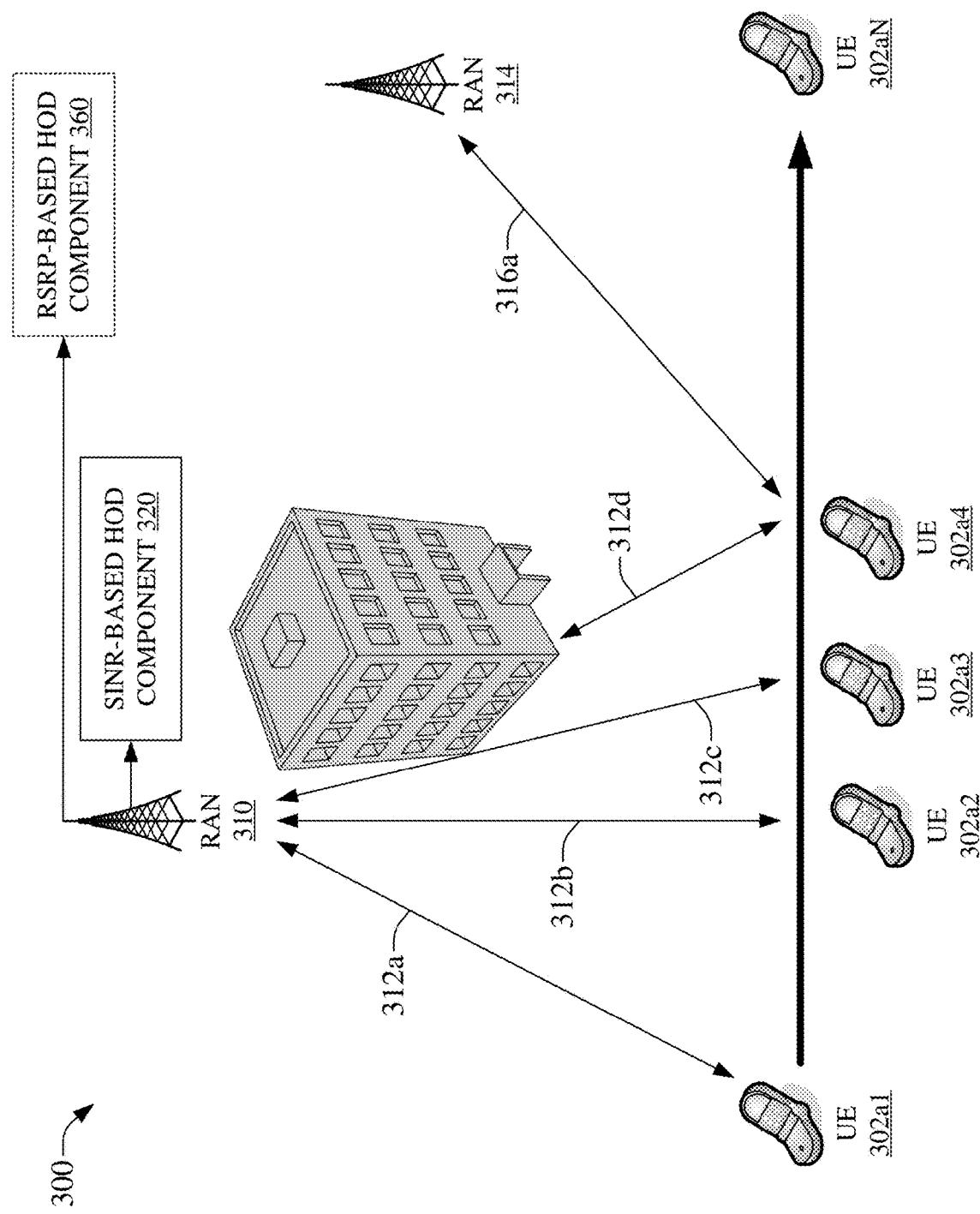
FIG. 3 is an illustration of an example system that highlights a benefit of employing faster SINR-based handover determinations in place of typically slower RSRP-based handover determinations, in accordance with aspects of the subject disclosure.

FIG. 3 is an illustration of a system 300, highlighting a benefit of employing faster SINR-based handover determinations in place of typically slower RSRP-based handover determinations, in accordance with aspects of the subject disclosure. Whereas SINR values can be determined at a base station, RAN device, etc., the SINR value can typically be determined much faster than an RSRP report. The speed of determining SINR values can allow handover events to occur much more rapidly and accurately in response to determined changes in channel characteristics, e.g., strength, interference, noise, etc. Accordingly, system 300 can comprise RAN 310 that can communicate with UE 302 as it moves from position a1, e.g., UE 302a1, towards position aN, e.g., UE 302aN. The channel characteristics can change as the UE moves along the indicated path, e.g., channel characteristics at 312a can be different from 312b, which can be different from 312c, which can further be different from 312d, which, in turn, can be different from 316a. RAN 310 can communicate the channel characteristics to SINR-based HOD component 320 that can determine handover action data based on a determined SINR value, e.g., SINR-based HOD component 320 can comprise components that can be the same as, or similar to, SINR determination component 120, 220, etc., and HOD component 130, 230, etc. In an aspect, SINR-based HOD component 320 can typically generate HOD action data faster than RSRP-based HOD component 360 that can correspondingly cause a reference signal to be sent to UEs, allowing them to measure the reference signal and determine an RSRP value that is then communicated back before being available to instruct the initiation of a handover at RSRP-based HOD component 360.

In system 300, the beam at 312a can correspond to a sufficient SINR value and a handover can be avoided. Where UE 302a1 moves to UE 302a2, the beam at 312b can be different from that at 312a but can also still correspond to a sufficient SINR value that avoids a handover event from being initiated.

As the UE moves to UE 302a2, the beam at 312c can, for example, have increased attenuation due to minor occlusion by the illustrated office building. This can affect an UL more than a DL because the transmission power of a UE is generally less than that of a base station, RAN, etc. As such, in an RSRP-type handover determination, an RSRP report generated by the UE at 302a2 may not be successfully returned to RAN 310 and an RLF can occur. However, where RAN 310 determines SINR values via SINR-based HOD component 320, the greater attenuation of the UL channel is much less likely to result in an RLF. As the UE moves to 302a4, the building can fully occlude the beam at 312d, which can result in a SINR value that can trigger a handover, for example, to RAN 314 via a beam at 316a.

In an aspect, over time, many UEs may traverse many paths, generating channel characteristics reflective of the historical environment of the UEs, and a correspondingly large number of SINR values can be determined, e.g., via SINR-based HOD component 320. In some embodiments, these historical channel characteristics can be employed to precompute or predict, e.g., via machine learning, etc., SINR values. Accordingly, a predicted SINR value can be employed to determine initiating a handover. As an example, SINR values for beams along a stretch of highway can be correlated to weather, time of day, sporting or other events, traffic, road construction, etc., such that for a given set of environmental conditions, which can be measured, detected, designated, etc., SINR values can be predicted that can be used to 'map handovers,' e.g., as a UE moves along the stretch of highway, the UE can undergo handovers that were determined from historical channel characteristics from one or more UEs, over one or more time periods, for one or more weather conditions, . . . , etc. In an aspect, instant channel characteristics can also be used to determine a SINR value that can then be used to validate a predicted SINR value. In some embodiments, where the predicted SINR value is validated to a current SINR value, the predicted SINR values can be used for a period of time before being checked for validity again. In some embodiments, the period of time can be recurrent, e.g., the validation can occur every 1 minute, every 1 hour, every 1 day, etc., while in other embodiments the period of time can be variant, e.g., validity can be checked at random times, can be check every 1 hour unless a measurement has been invalid and then every one minute until five valid measurements are found, or according to nearly any other time scheme.

Figure 4:
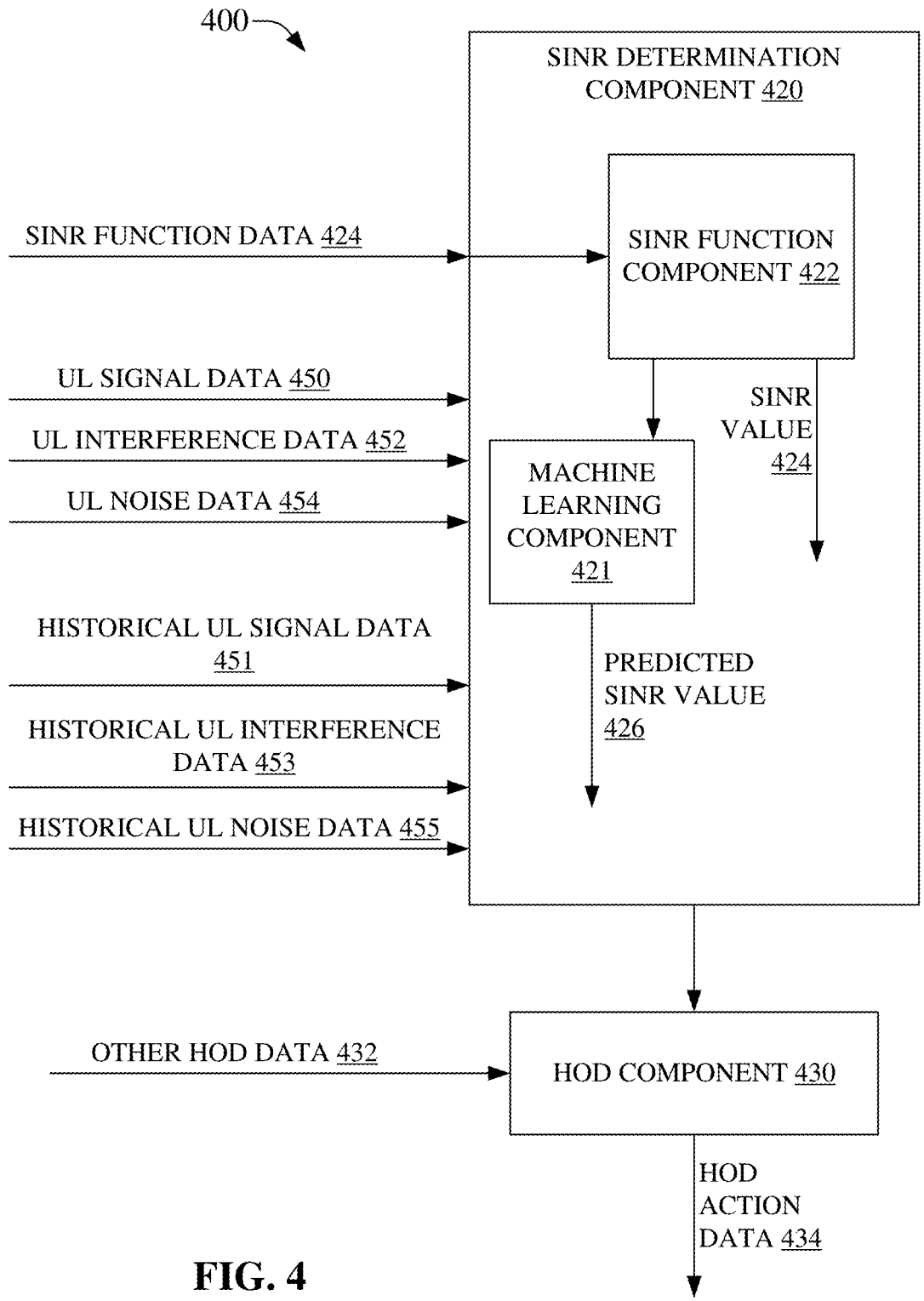
FIG. 4 illustrates an example system that can facilitate determining predicted and/or current SINR values that can be employed in deciding a UE handover occurrence, in accordance with aspects of the subject disclosure.

FIG. 4 is an illustration of a system 400, which can enable determining predicted and/or current SINR values that can be employed in deciding a UE handover occurrence, in accordance with aspects of the subject disclosure. System 400 can comprise SINR determination component 420 that can comprise SINR function component 422. SINR determination component can receive SINR function data 424 that can comprise information relating to a SINR function that can be employed to generate a SINR value based on beam/environment condition measurements. SINR function data 424 can be employed to designate, update, alter, etc., an applied SINR function at SINR function component 422. Beam/environment condition measurements can be received by SINR determination component 420 and can be passed to SINR function component 422, machine learning component 421, etc., where they can be subjected to a SINR function to yield SINR value 424, or predicted SINR value 426 correspondingly. These values can be made available to HOD component 430. In an aspect, beam/environment condition measurements can comprise UL signal data 450 which can measure usable signal power, UL interference data 452 that can measure interference power, UL noise data 454 that can measure noise value, historical UL signal data 451, historical UL interference data 453, historical UL noise data 455, etc.

HOD component 430 can determine HOD action data 434 based on received SINR value 424, on received predicted SINR value 426, combinations thereof, etc., from SINR determination component 420, and, in some embodiments, further based on other HOD data 432, as disclosed elsewhere herein. HOD action data 434 can be communicated to a RAN device, e.g., RAN 110, 114, etc., wireless network node, e.g., gNB, eNB, etc., and can cause initiation of a handover event, e.g., trigger, cause, result in, etc., a handover event occurring.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
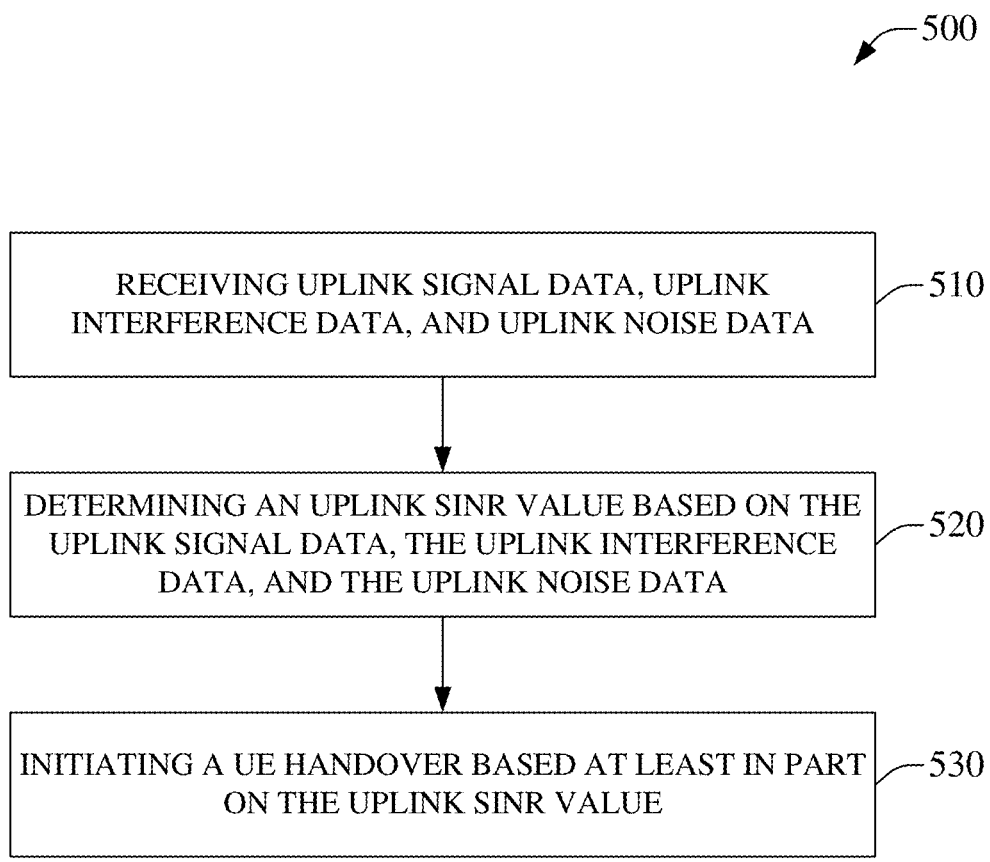
FIG. 5 is an illustration of an example method employing SINR values in determining initiation of UE handover events, in accordance with aspects of the subject disclosure.

FIG. 5 is an illustration of an example method 500, employing SINR values in determining initiation of UE handover events, in accordance with aspects of the subject disclosure. Method 500, at 510, can comprise receiving channel characteristics that can comprise uplink signal data, uplink interference data, and uplink noise data. Uplink signal data can indicate a signal-strength for a channel. Uplink interference data can indicate interference levels for the channel. Accordingly, uplink noise data can indicate channel noise. In an aspect, particularly for time multiplexed channels, the uplink characteristics can be substituted for the downlink characteristics because the uplink and downlink can occur on the same channel, just in different time slots, albeit, that a resulting SINR value can be normalized for the transmit power associated with the particular uplink or downlink transmitter.

Method 500, at 520, can comprise determining an uplink SINR value based on the uplink signal data, uplink interference data, and uplink noise data received at 510. In an embodiment, SINR can be equal to the power of measured usable signals (S), for example, reference signals, physical shared channel signals, etc., divided by the sum of interference power (I) and background noise (N), wherein interference power can be the measured power of interfering channels from other nodes of a wireless system, etc., and wherein noise can be determined for measurement bandwidths and receiver noise coefficients. In other embodiments SINR can be based on a variant of $$SINR = S/(I+N),$$
$$\text{e.g., } SINR = \frac{1}{\frac{1}{12*RSRQ} - x},$$

as disclosed elsewhere herein, etc.

At 530, method 500 can comprise initiating a UE handover based at least in part on the uplink SINR value determined at 520. At this point, method 500 can end. In an aspect, if the uplink SINR value is determined to satisfy a rule related to handover conditions, then a handover can be initiated. In an embodiment, where the SINR value indicates that a channel, beam, etc., is performing below a threshold level, a handover to a better performing channel, beam, etc., can be initiated. As an example, as a UE moves along a path having increasing interference levels, e.g., the UE moves into an increasingly electromagnetically-crowded area, etc., the SINR value can reflect the degraded channel conditions and can be employed to trigger a handover event that can result in the UE being attached to a better channel.

Figure 6:
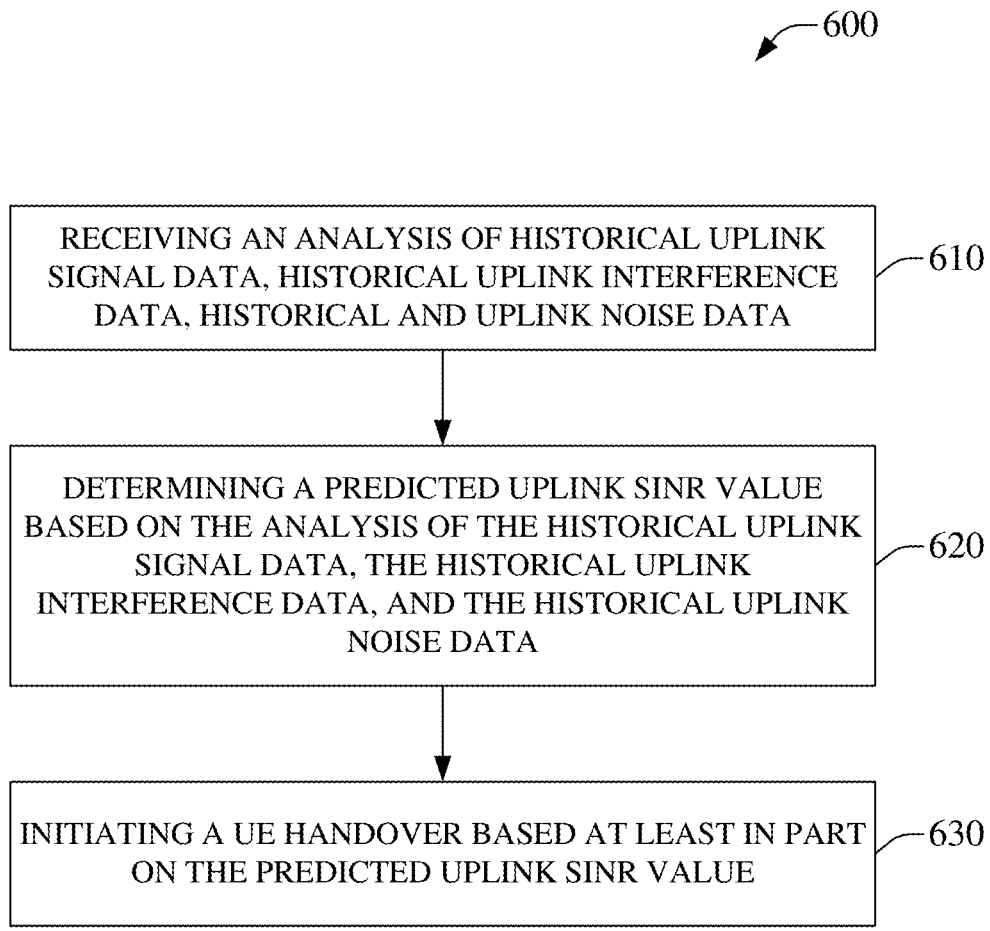
FIG. 6 is an illustration of an example method employing predictive SINR values in determining initiation of UE handover events, in accordance with aspects of the subject disclosure.

FIG. 6 is an illustration of an example method 600, employing predictive SINR values in determining initiation of UE handover events, in accordance with aspects of the subject disclosure. At 610, method 600 can comprise receiving an analysis of historical channel characteristics that can comprise historical uplink signal data, historical uplink interference data, historical uplink noise data, etc. The historical channel characteristics, in an aspect, can correspond to one or more historical UE measurements, e.g., historical channel data for UEs previously in the wireless network environment, etc. In another aspect, the historical channel characteristics can be correlated to historical events or other historical data, e.g., historical traffic, weather, events, gatherings, emergencies, etc., which can facilitate predicting a SINR value for a current wireless network environment based on the historical data described herein.

Method 600, at 620, can comprise determining a Predicted uplink SINR value based on the analysis of the historical uplink signal data, historical uplink interference data, historical uplink noise data, etc., received at 610. As before, in an embodiment, SINR can be equal to the power of measured usable signals (S), for example, reference signals, physical shared channel signals, etc., divided by the sum of interference power (I) and background noise (N), wherein interference power can be the measured power of interfering channels from other nodes of a wireless system, etc., and wherein noise can be determined for measurement bandwidths and receiver noise coefficients. In other embodiments SINR can be based on a variant of $$SINR = S/(I+N),$$
$$\text{e.g., } SINR = \frac{1}{\frac{1}{12*RSRQ} - x},$$

as disclosed elsewhere herein, etc. However, machine learning or other predictive algorithms can be employed to learn from the historical data and to predict probable SINR values based on current conditions, environment, events, etc. As an example, where historical data during a football game indicates in increase in electromagnetic noise, a predicted SINR value during a future football game can reflect a higher noise level inferred from the historical data.

At 630, method 600 can comprise initiating a UE handover based at least in part on the predicted uplink SINR value determined at 620. At this point, method 600 can end. Where a predicted uplink SINR value is determined to satisfy a rule related to handover conditions, then a handover can be initiated. In an embodiment, the predicted SINR values can be 'mapped' to wireless environment data, e.g., UE position/location, beam position/location, weather, traffic, etc., to proactively define handover topologies, e.g., it can be predicted where/when/how a SINR value will transition a threshold level or otherwise satisfy a rule related to initiating a handover event, such that the handover automatically occurs based on the when/where/how occurring in real time.

Figure 7:
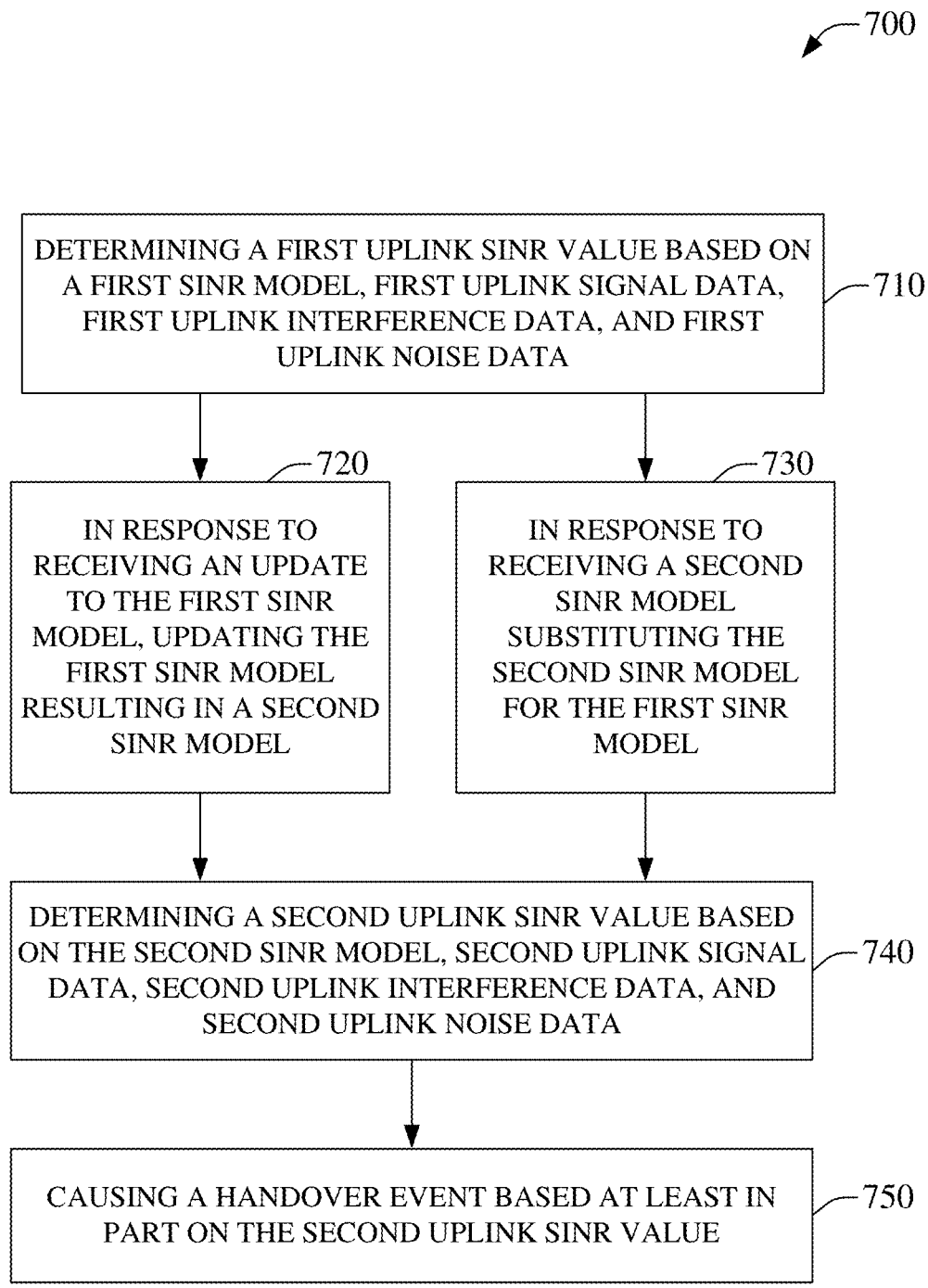
FIG. 7 illustrates an example method facilitating, in response to a change to a SINR model, updating a SINR value that is employable in determining initiation of a UE handover event, in accordance with aspects of the subject disclosure.

FIG. 7 illustrates example method 700 facilitating updating a SINR value in response to a change to a SINR model, wherein the SINR value is employable in determining initiation of UE handover events, in accordance with aspects of the subject disclosure. Method 700, at 710, can comprise determining a first UL SINR value based on a first SINR model, first UL signal data, first UL interference data, first UL noise data, etc.

At 720, method 700 can comprise updating the first SINR model, in response to receiving an update to the first SINR model, resulting a second SINR model. In an embodiment, the SINR model can be updated based on receiving an update to the model. Similarly, at 730, the first SINR model can be updated to the second SINR model in response to receiving an updated model. In an embodiment, the receiving the updated model can be distinct from receiving an update to an existing model, e.g., a new model rather than an update to a model.

At 740, determining second UL SINR value can be based on the second SINR model, e.g., the updated or new SINR model from either 720 or 730. The second UL SINR value can further be based on second UL signal data, second UL interference data, second UL noise data, etc. In an aspect, the SINR model can be updated allowing for updated results based on then current channel characteristics, then current environmental conditions, etc.

At 750, method 700 can comprise causing handover event based at least in part on the second UL SINR value. At this point, method 700 can end. In an aspect, causing the handover event can comprise initiating, triggering, allowing, etc., the handover event to occur based on the second UL SINR value.

Figure 8:
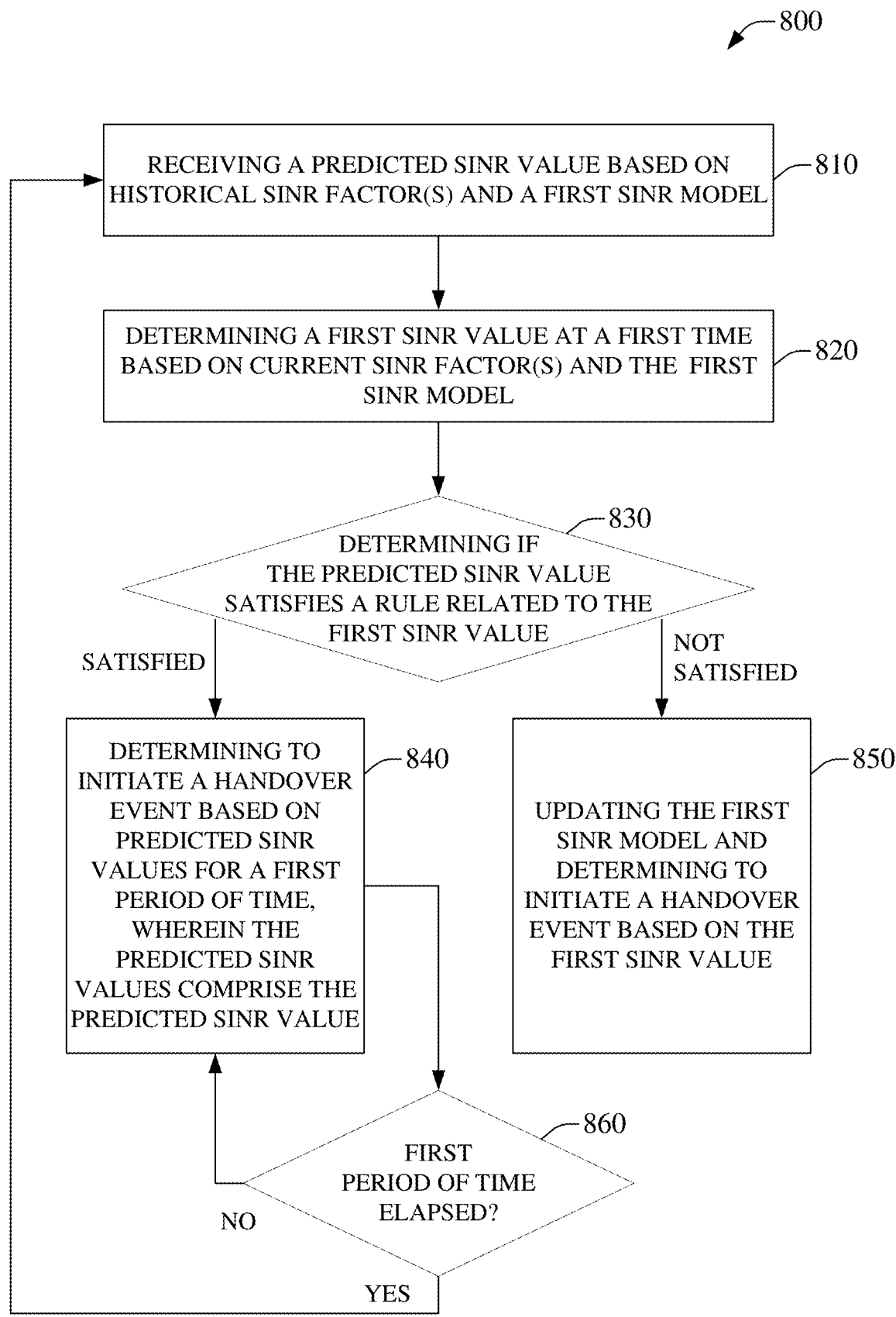
FIG. 8 illustrates an example method enabling employing predictive SINR values over a period of time, where a predictive SINR value can be validated, in determining initiation of UE handover events, in accordance with aspects of the subject disclosure.

FIG. 8 illustrates example method 800, which can enable employing predictive SINR values over a period of time, where a predictive SINR value can be validated, in determining initiation of UE handover events, in accordance with aspects of the subject disclosure. Method 800, at 810, can comprise receiving a predicted SINR value, wherein the predicted SINR value can be based on historical SINR factor(s), e.g., historical channel characteristic(s), historical wireless environmental conditions, or other relevant historical data.

At 820, method 800 can comprise determining a first SINR value at a first time based on then current SINR factor(s) and the first SINR model. This can result in a current SINR value that can be used to evaluate the predicted SINR value received at 810. In an aspect, the SINR values, e.g., predicted and current, can be employed to validate the predicted SINR value.

At 830, it can be determined if the predicted SINR value satisfies a rule related to the first SINR value. As an example, if the predicted SINR value is sufficiently similar to the first SINR value, then the predicted SINR value can be regarded as valid. As another example, if the predicted SINR value is not sufficiently similar to the first SINR value, it can be determined that the first SINR model, the prediction mechanism, etc., can be insufficiently accurate and that the first SINR model, prediction technique, etc., should be update to produce more accurate results that comport with the current SINR conditions, factors, etc.

Where decision block 830 is satisfied, at 840, method 800 can comprise determining to initiate a handover event based on predicted SINR values for a first period of time. In an aspect, the predicted SINR values for the first period of time can comprise the predicted SINR value from 810. Block 840 can be regarded as using the predicted SINR values wherein the predications have been validated against the first SINR value determined at 820. In an aspect, it will be appreciated that where the generation of predicted SINR values is deemed valid, then the predicted values can be used for a first period of time, e.g., until a next attempt at validation of a predicted SINR value. At this point, method 800 can advance to block 860.

However, where decision block 830 is not satisfied, at 850, method 800 can comprise updating the first SINR model and determining to initiate a handover event based on the first SINR value. In an aspect, this can be regarded as determining that the prediction technique, model, etc., is not producing valid results and, accordingly, the model, technique, etc., can be updated to produce more valid results. However, the first SINR value can also be used to determine if a handover should occur, e.g., the first SINR value is already determined for the current time. At this point method 800 can end.

At 860, method 800 can comprise determining if the first period of time has elapsed. In an aspect, the first period of time can represent a selectable time for which the validation is assumed to indicate that the predicted SINR values will be sufficiently accurate. Accordingly, upon expiration of the first period of time, the validation can again occur, e.g., method 800 can return to block 810 to revalidate the prediction mechanism for a next period of time. However, where the first period of time has not yet elapsed, method 800 can return to block 840 until the first period of time has elapsed. In some embodiments, other indications, events, signals, etc., can be employed to escape the 840 and 860 time loop.

Figure 9:
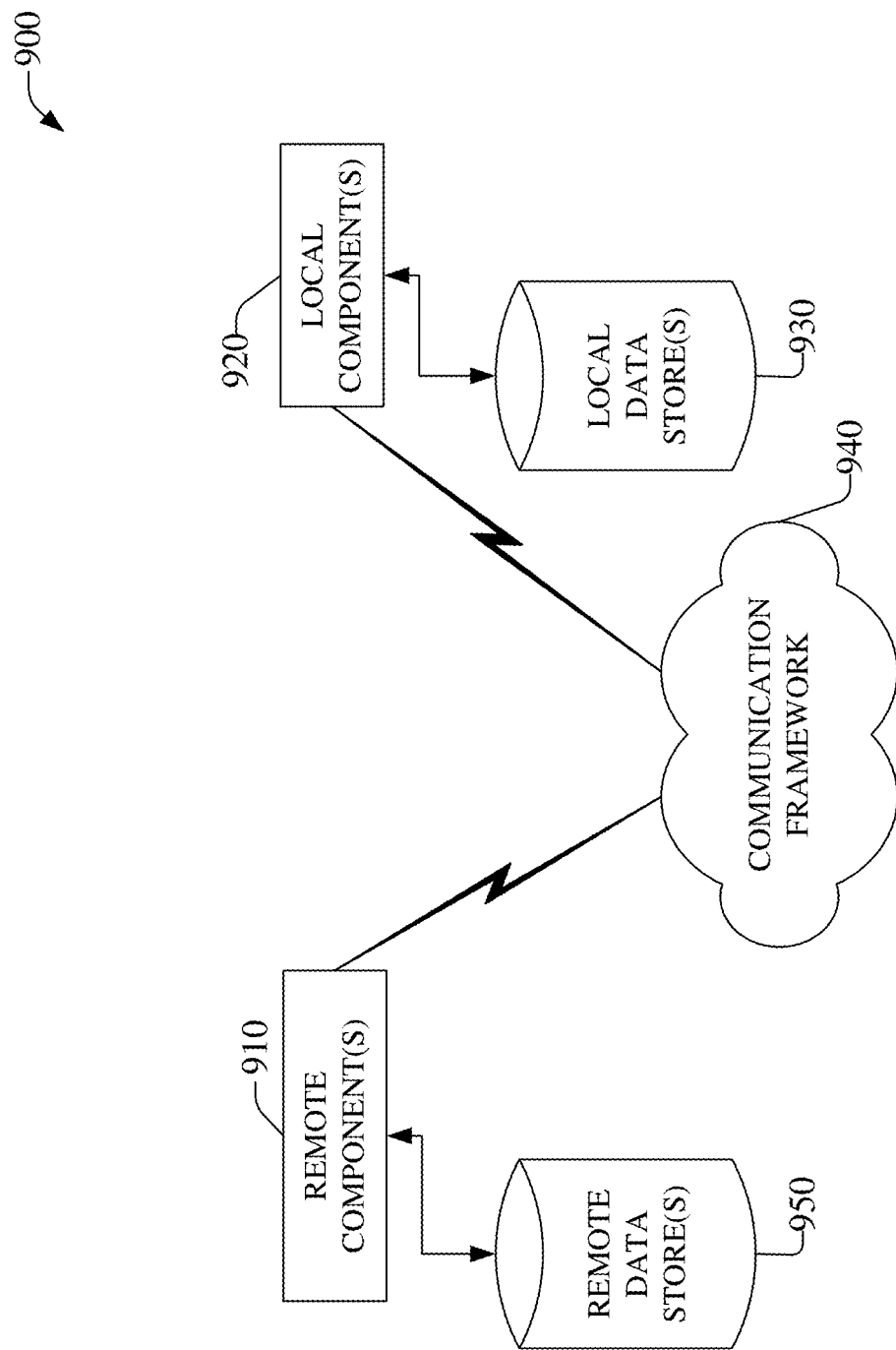
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise SINR determination component 120, 220, 420, etc., SINR-based HOD component 320, etc., HOD component 130, 230, 430, etc., or other remotely located components.

The system 900 also comprises one or more local component(s) 920. The local component(s) 920 can be hardware and/or software (e.g., threads, processes, computing devices). In some embodiments, local component(s) 920 can comprise RAN 110, 114, 310, 314, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. As an example, SINR determination component 120 can store SINR prediction model(s), SINR determination model(s), SINR value(s), current or historical channel characteristic(s), current or historical environmental feature(s)/condition(s)/event(s), etc. Similarly, local component(s) 920 can be operably connected to one or more local data store(s) 930, that can be employed to store information on the local component(s) 920 side of communication framework 940. As an example, RAN 110 can store current or historical channel characteristic(s), current or historical environmental feature(s)/condition(s)/event(s), etc.

Figure 10:
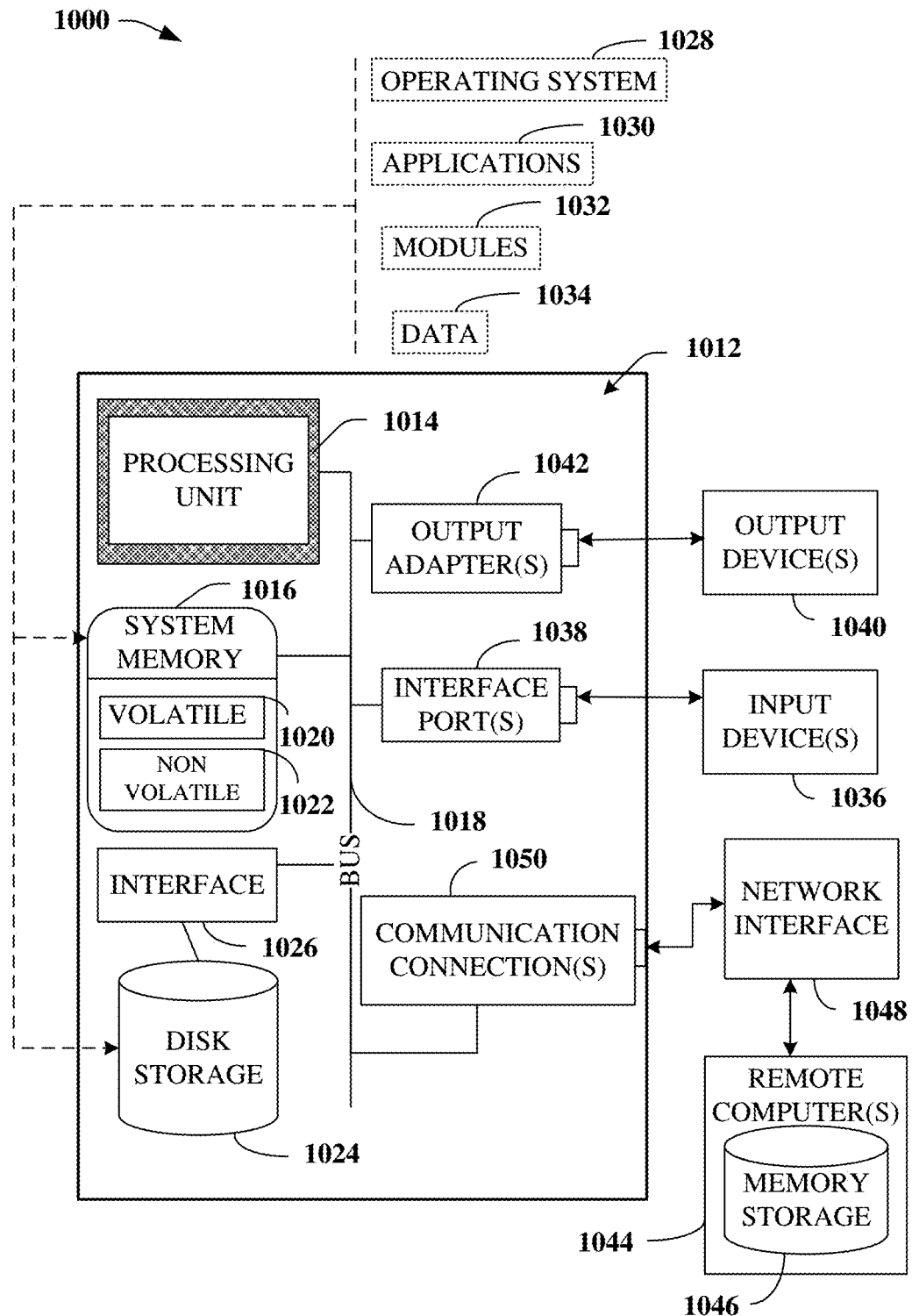
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in SINR determination component 120, 220, 420, etc., SINR-based HOD component 320, etc., HOD component 130, 230, 430, etc., RAN 110, 114, 310, 314, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining handover event action data based on an UL: SINR value to enable a UE to be handed over to another network edge device, the handover event action data can be updated based on an updated SINR model such that a handover event can occur in accord with the updated handover event action data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
    a processor; and
    a memory that stores executable instructions that, when executed by the processor, facilitate performance of operations, comprising:
        in response to establishing a first connection with a first radio access network edge device to support a communication session, employing a signal-to-interference-plus-noise ratio value to determine a parameter of a handover event to switch the communication session from being supported by the first connection to being supported by a second connection with a second radio access network edge device; and
        initiating the handover event according to the parameter of the handover event resulting in the second connection with the second radio access network edge device supporting the communication session, wherein employing the signal-to-interference-plus-noise ratio value enables applying machine learning to determine the initiating of a handover event more quickly than basing the initiating on a reference signal reported to a base station.

2. The device of claim 1, wherein the signal-to-interference-plus-noise ratio value is employed instead of a reference signal receive power value to determine the parameter of the handover event.

3. The device of claim 1, wherein the signal-to-interference-plus-noise ratio value is an uplink signal-to-interference-plus-noise ratio value detected by the first radio access network edge device.

4. The device of claim 1, wherein the signal-to-interference-plus-noise ratio value is an uplink signal-to-interference-plus-noise ratio value detected by the second radio access network edge device.

5. The device of claim 1, wherein at least one of the first radio access network edge device and the second radio access network edge device is a fifth generation (5G) new-radio device.

6. The device of claim 1, wherein the employing the signal-to-interference-plus-noise ratio value results in a faster handover time than a handover time resulting from initiating the handover event based on a reference signal receive power value.

7. The device of claim 1, wherein the employing the signal-to-interference-plus-noise ratio value results in an increased handover success rate relative to a handover success rate resulting from initiating the handover event based on a reference signal receive power value.

8. The device of claim 1, wherein the employing the signal-to-interference-plus-noise ratio value results in an improved new-radio beam handover accuracy relative to a handover accuracy resulting from initiating the handover event based on a reference signal receive power value.

9. The device of claim 1, wherein the signal-to-interference-plus-noise ratio value is determined based on at least one of an inter-symbol interference, an inter-frequency interference, an inter-cell interference, or at least one of noise from the environment or noise from a neighboring wireless system.

10. A method, comprising:
receiving, by a system comprising a processor, a channel characteristic for a first connection with a first radio access network edge device supporting a communication session;
determining, by the system and based on a signal-to-interference-plus-noise ratio value, a parameter of a handover event to switch the communication session from being supported by the first connection to being supported by a second connection with a second radio access network edge device; and
triggering, by the system, the handover event according to the parameter of the handover event resulting in the second connection with the second radio access network edge device supporting the communication session, wherein employing the signal-to-interference-plus-noise ratio value facilitates applying machine learning to determine the triggering of the handover event faster in comparison to triggering based on reporting a reference signal to a base station.

11. The method of claim 10, wherein the determining the parameter is based on the signal-to-interference-plus-noise ratio value in lieu of a reference signal receive power value.

12. The method of claim 10, wherein the determining the parameter of the handover event based on the signal-to-interference-plus-noise ratio value is based on an uplink signal-to-interference-plus-noise ratio value detected by the first radio access network edge device.

13. The method of claim 10, wherein the determining the parameter of the handover event based on the signal-to-interference-plus-noise ratio value is based on an uplink signal-to-interference-plus-noise ratio value detected by the second radio access network edge device.

14. The method of claim 10, wherein the triggering the handover event occurs faster by employing the signal-to-interference-plus-noise ratio value in comparison to triggering the handover event based on a reference signal receive power value.

15. The method of claim 10, wherein the triggering the handover event by employing the signal-to-interference-plus-noise ratio value has a lower probability of a radio link failure than a probability associated with triggering the handover event based on a reference signal receive power value.

16. A machine-readable storage medium, comprising executable instructions that, when executed by a processor, facilitate performance of operations, comprising:
receiving a channel characteristic for a first connection with a first radio access network edge device supporting a communication session;
determining, based on a signal-to-interference-plus-noise ratio value, a parameter of a handover event to switch the communication session from being supported by the first connection to being supported by a second connection with a second radio access network edge device; and
triggering, based on a signal-to-interference-plus-noise ratio value and a previously computed library of signal-to-interference-plus-noise ratio values, the handover event according to the parameter of the handover event resulting in the second connection with the second radio access network edge device supporting the communication session, wherein triggering the handover event based on the signal-to-interference-plus-noise ratio value occurs faster in comparison to triggering the handover event based on reporting a reference signal to a base station.

17. The machine-readable storage medium of claim 16, wherein determining the parameter is based on the signal-to-interference-plus-noise ratio value in lieu of a reference signal receive power value.

18. The machine-readable storage medium of claim 16, wherein determining the parameter of the handover event based on the signal-to-interference-plus-noise ratio value is based on an uplink signal-to-interference-plus-noise ratio value detected by the first radio access network edge device.

19. The machine-readable storage medium of claim 16, wherein determining the parameter of the handover event based on the signal-to-interference-plus-noise ratio value is based on an uplink signal-to-interference-plus-noise ratio value detected by the second radio access network edge device.

20. The machine-readable storage medium of claim 16, wherein triggering the handover event occurs faster by employing the signal-to-interference-plus-noise ratio value than triggering the handover event based on a reference signal receive power value, and wherein the triggering corresponds to a lower probability of a radio link failure than a probability associated with triggering the handover event based on a reference signal receive power value.

* * * * *